US008864045B1

(12) United States Patent
Jiang et al.

(10) Patent No.: US 8,864,045 B1

(45) Date of Patent: Oct. 21, 2014

(54) AEROSOL FABRICATION METHODS FOR MONODISPERSE NANOPARTICLES

(75) Inventors: Xingmao Jiang, Albuquerque, NM (US); C. Jeffrey Brinker, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 494 days.

(21) Appl. No.: 13/300,069

(22) Filed: Nov. 18, 2011

Related U.S. Application Data

(60) Provisional application No. 61/458,233, filed on Nov. 19, 2010.

(51) Int. Cl.
*B05B 1/24* (2006.01)

(52) U.S. Cl.
USPC ............. 239/13; 239/128; 239/135; 239/136; 427/123; 427/124; 977/773; 977/857; 423/592.1; 423/604; 423/605; 423/607; 423/632

(58) Field of Classification Search
USPC ............ 239/1, 3, 4, 13, 128, 135, 136, 102.1, 239/102.2, 690; 427/123, 124, 217; 423/592.1, 594.17, 594.19, 604–608, 423/622, 632; 977/773, 857
See application file for complete search history.

(56) References Cited

U.S. PATENT DOCUMENTS

| | | | | |
|---|---|---|---|---|
| 5,873,523 | A * | 2/1999 | Gomez et al. | 239/3 |
| 7,306,823 | B2 * | 12/2007 | Sager et al. | 977/857 |
| 7,820,124 | B1 * | 10/2010 | Krishna et al. | 423/592.1 |

OTHER PUBLICATIONS

Jiang et al., “Aerosol-Assisted Self Assembly of Single-Crystal Core/Nanoporous Shell Particles as Model Controlled Release Capsules,” J. Am. Chem. Soc., 128, 4512-4513.

Lu et al., “Aerosol-Assisted Self-Assembly of Mesostructured Spherical Nanoparticles,” Letters to Nature, vol. 398, Mar. 18, 1999, pp. 223-226.

Elkins et al., “Monodisperse Face-Centered Tetragonal FePt Nanoparticles with Giant Coercivity,” J. Phys. D: Appl. Phys, 38, 2005, 2306-2309.

Kang et al., “Microstructures and Magnetic Alignment of L10 FePt Nanoparticles,” Journal of Applied Physics, 101, 2007, 09J113-1 through 09J113-3.

* cited by examiner

*Primary Examiner* — Steven J Ganey

(74) *Attorney, Agent, or Firm* — MH2 Technology Law Group, LLP

(57) ABSTRACT

Exemplary embodiments provide materials and methods for forming monodisperse particles. In one embodiment, the monodisperse particles can be formed by first spraying a nanoparticle-containing dispersion into aerosol droplets and then heating the aerosol droplets in the presence of a shell precursor to form core-shell particles. By removing either the shell layer or the nanoparticle core of the core-shell particles, monodisperse nanoparticles can be formed.

22 Claims, No Drawings

AEROSOL FABRICATION METHODS FOR MONODISPERSE NANOPARTICLES

RELATED APPLICATIONS

This application claims priority to U.S. Provisional Patent Application Ser. No. 61/458,233, filed Nov. 19, 2010, which is incorporated by reference herein in its entirety.

GOVERNMENT RIGHTS

This invention was made with Government support under Contract No EY016570 awarded by the National Institutes of Health. This invention was also made with Government support under Contract No. DE-AC04-94AL85000 awarded by the U.S. Department of Energy to Sandia Corporation. The U.S. Government has certain rights in the invention.

BACKGROUND

High purity monodisperse nanoparticles (NP) with desirable composition, size, structure, morphology, and crystalline phase have found increasing applications in catalysis, optical, electronic, and energy applications, display and solid-state lighting, separation membranes, protective coatings, sensors, biotechnology, batteries, solar cells, semiconductor and electronics applications.

Conventional processes, such as milling, metal vaporization, chemical vapor deposition, laser pyrolysis, reverse microemulsion, and sol gel techniques, for forming monodisperse nanoparticles often generate aggregated particles, which are lack of control of crystalline phase. For example, conventional reverse microemulsion and sol gel techniques are used to provide control of nanoparticle size, structure, and composition but cannot solve the problems of nanoparticle aggregation/sintering during the thermal treatment. Additionally, these conventional processes are cost-expensive.

It is therefore desirable to provide a method for forming monodisperse particles with reduced or eliminated nanoparticle aggregation. It is also desirable to provide a low cost manufacturing method for forming monodisperse particles with tailored size, structure, composition, phase, crystallinity, etc.

SUMMARY

According to various embodiments, the present teachings include a method of forming monodisperse particles. In this method, a plurality of aerosol droplets can be formed by spraying a dispersion including a plurality of nanoparticles disposed in a solvent. The solvent can include hydrocarbon. The plurality of aerosol droplets can then be heated at a heating temperature to induce hydrocarbon pyrolysis such that a carbonaceous shell layer is coated on each of the plurality of nanoparticles. Monodisperse nanoparticles can be formed as recovered nanoparticles by removing the carbonaceous shell layer from each of the plurality of nanoparticles.

According to various embodiments, the present teachings also include a method of forming monodisperse particles. In this method, a plurality of aerosol droplets can be formed by spraying a dispersion including a plurality of nanoparticles disposed in a solvent. The plurality of aerosol droplets can then be heated in a presence of one or more salts at a temperature to generate salt vapor. The salt vapor can be deposited as a salt shell layer on each nanoparticle of the plurality of nanoparticles. Monodisperse nanoparticles can be formed as recovered nanoparticles by removing the salt shell layer from each of the plurality of nanoparticles.

According to various embodiments, the present teachings further include a method of forming monodisperse particles. In this method, a plurality of aerosol droplets can be formed by spraying a dispersion including a plurality of nanoparticles disposed in a solvent. The plurality of aerosol droplets can then be heated in a presence of one or more of a metal-containing precursor, a hydrocarbon solvent, and combinations thereof at a heating temperature such that a shell layer including a metal shell layer, a metal alloy shell layer, a carbonaceous shell layer, or combinations thereof is deposited on each nanoparticle of the plurality of nanoparticles. By removing each nanoparticle of the plurality of nanoparticles from the shell layer, a plurality of hollow particles that are monodisperse can be formed.

It is to be understood that both the foregoing general description and the following detailed description are exemplary and explanatory only and are not restrictive of the present teachings, as claimed.

DESCRIPTION OF THE EMBODIMENTS

Reference will now be made in detail to exemplary embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Exemplary embodiments provide materials and methods for forming monodisperse particles. As used herein, the term "monodisperse particles" refers to particles possessing a narrow average particle size distribution. In one particular embodiment, the particles can possess a narrow average particle size distribution with less than 5% size dispersion, meaning that less than 5% of the population lies on either side of the mean particle size value. In certain cases, the term "monodisperse particles" means all particles in a formulation have the same particle size or diameter. In embodiments, the monodisperse particles can have desired controllable size, structure, composition, phase, crystallinity, etc. In embodiments, no-aggregation can exist between monodisperse particles.

The monodisperse particles can be formed from aerosol droplets, which are then processed to form monodisperse aerosol particles. For example, the aerosol droplets can be formed by spraying a nanoparticle dispersion containing nanoparticles in a solvent using a carrier (or atomization) gas. The carrier/atomization gas can include, for example, nitrogen. The aerosol droplets can thus be suspended droplets in a gas mixture. The gas mixture can include the carrier gas and/or the gas vapor generated by, for example, solvents or other components, of the nanoparticle dispersion. In embodiments, an atomizer, such as a TSI 9302A atomizer can be used to form aerosol droplets.

The solvent for dispersing the nanoparticles can include, but not be limited to, a hydrophilic solvent, a hydrophobic solvent, and combinations thereof. The solvent can be, e.g., water. Alternatively, the solvent can include hydrocarbon solvents including ethanol, hexane, etc.

Once formed, the aerosol droplets can then be heated. For example, the aerosol droplets can be introduced into an aerosol reactor located in a furnace and heated by the furnace. In one example, the furnace can be a Lindberg furnace as known in the art. The aerosol reactor can function as a reaction chamber in which various reactions can occur. For example, the aerosol reactor can be formed of a glass or quartz and in a tubular shape with varying dimensions as needed at stages of the reactor. The aerosol reactor can be of any suitable length, diameter or dimension, and material to accommodate the necessary reactions.

The aerosol droplets can be heated at a predetermined temperature and for a predetermined time, where at least the heat transport and the induced solvent boiling can cause segregation of the nanoparticles and can cause dispersion of the nanoparticles in the aerosol or the gas mixture. For example, a residence heating time of the aerosol droplets within the heated region of the aerosol reactor can be from about 0.01 seconds to about 5 minutes at a heating temperature ranging from about 600° C. to about 1600° C., or from about 700° C. to about 1400° C., for from about 800° C. to about 1200° C., although the residence heating time and the heating temperature are not limited. Depending on the shell precursors used, the predetermined heating temperature can vary, for example, according to a temperature for generating vapor of the shell precursors and/or according to a reaction or deposition temperature of the shell precursor to form the shell layer.

Following the heating process of the aerosol droplets, a plurality of core-shell particles can be formed. Each core-shell particle can include a shell layer surrounding (continuously or non-continuously) or coated on at least one nanoparticle as a core element. The core-shell particles can have an average particle size ranging from about 5 nm to about 10 μm, or from about 10 nm to about 1 μm. In embodiments, the core-shell particles can be in the nano-scale and can be monodisperse. In embodiments, the shell layer of the core-shell particles can be removed leaving nanoparticles cores that are monodisperse.

The nanoparticle in the core-shell structure can also be referred to herein as a "nanoparticle core". The nanoparticle core can be a core element formed by processing the nanoparticles from the nanoparticle dispersion. Nanoparticles dispersed in the solvent can include e.g., metal, metal alloy, metal oxide, metal nitride, metal carbide, etc. In embodiments, the dispersed nanoparticles can be preformed particles, e.g., formed by sol-gel wet chemistry. The nanoparticles dispersed in the solvent can be spherical nanoparticles of uniform size prior to forming aerosol droplets. The nanoparticles can include multiple layers of metal, carbon, and/or salts. In embodiments, the multiple metal/salt nanoparticles can be fabricated by sol-gel wet chemistry and/or azeotropic distillation assisted reverse microemulsion fabrication techniques.

In one embodiment, nanoparticles dispersed in the solvent can be processed by, e.g., spraying into aerosol droplets, then deposited by one or more shell precursors (e.g., vaporized metal, salt, hydrocarbon pyrolysis derived carbon, etc.), to form a shell layer on the nanoparticle core having a core-shell nanostructure, and then recovered as monodisperse nanoparticles after removal of shell layers, with or without further thermal treatment. During this process, the nanoparticles, i.e., as originally dispersed in the solvent of the nanoparticle dispersion, then atomized in the aerosol droplets, and then deposited by a shell layer, and further recovered into monodisperse nanoparticles can remain the same without any physical/chemical changes/modifications. However, in other cases, the nanoparticles can undergo physical and/or chemical changes/modifications/reactions during the formation process depending on selections of the nanoparticle materials and the formation conditions.

The nanoparticles in the original nanoparticle dispersion can include, for example, one or more metal oxides including $SiO_2$, $Al_2O_3$, $Ti_2O_3$, $LiMn_2O_4$, etc., one or more metal nitrides including $Si_3N_4$, AlN, FeN, TiN, etc., one or more metals including Ni, Au, Ag, Pd, Pt, Ga, Zn, Ce, Mo, W, Ti, Li, Mn, Zr, V, Nb, Y, Sn, Cu, Cr, Ge, Fe, etc., one or more metal alloys formed of two or more metals selected from Ni, Au, Ag, Pd, Pt, Ga, Zn, Ce, Cr, Ge, Fe, Mo, W, Ti, Li, Mn, Zr, V, Nb, Y, Sn, Cu, etc. For example, the metal alloy core can include FePt, CoPt, etc.

To form a shell layer on or surrounding the nanoparticle core, the aerosol droplets can be reacted, e.g., in the aerosol reactor, in the presence of shell precursor(s). The shell precursor(s) can be previously dispersed in the nanoparticle dispersion for the aerosol droplets or otherwise placed in the aerosol reactor to attend reactions in the aerosol reactor.

Depending on the selected shell precursors, the shell layer of each core-shell particle can include for example, salt, metal, metal alloy, metal oxide, carbonaceous materials, and/or their combinations.

Exemplary carbonaceous shell layer can include a material of, e.g., hydrocarbon-pyrolysis-induced carbon; a reaction product between the nanoparticle core and any precursor materials present in the aerosol reaction, etc. For example, the carbonaceous shell layer can be a layer of carbon obtained from pyrolysis of hydrocarbon solvent. In another example, the carbonaceous shell layer can be a layer of SiC, a reaction product between a nanoparticle core of $SiO_2$ and a hydrocarbon solvent at the heating temperature of the aerosol reactor.

Exemplary salt shell layer can include crystal salt formed from salts including, but not limited to, LiCl, NaCl, KCl, LiBr, NaBr, KBr, or combinations thereof.

Exemplary metal or metal alloy shell layer can include one or more metals selected from the group consisting of Ni, Au, Ag, Pd, Pt, Ga, Zn, Ce, Cr, Ge, Fe, and combinations thereof. For example, the metal alloy shell layer can include metals of Au, Ag, Cu, Sn, or combinations thereof.

The thickness of the shell layer such as, for example, a salt shell layer, a carbonaceous shell layer, and/or a metal/metal alloy shell layer can be controlled by, e.g., the vapor pressure in the aerosol reactor, amount/distribution of the shell precursors, and temperature distribution. The shell thickness can be in the range from about 2 nm to about 1000 nm or about 10 nm to about 200 nm. The shell layer can provide inert protection of the nanoparticles from aggregation during the thermal treatment. In one embodiment, the shell layer can have a thickness sufficient to protect the silica core and block aggregation of nanoparticles during high-temperature heating process.

Following the heating process, the core-shell particles carried by the carrier gas can be optionally collected, e.g., using a filter and/or a filter paper. In embodiments, the core-shell particles can be monodisperse particles. In embodiments, the core-shell particles can further be processed. For example, by removing the shell layer or by removing the nanoparticle core, monodisperse nanoparticles based on the nanoparticle cores or hollow particles can be formed. Such monodisperse nanoparticles can have an average particle size ranging from about 5 nm to about 5 μm or from about 10 nm to about 200 nm.

In embodiments, before removing the shell layer or the nanoparticle core, further process, such as a calcination process, can be performed to the core-shell particles for desirable properties or structures.

In a first exemplary embodiment, core-shell particles can be formed each having a carbonaceous shell layer coated on at least one nanoparticle. Exemplary nanoparticles can be formed of $SiO_2$ and exemplary carbonaceous shell layer can be formed of hydrocarbon-pyrolysis induced carbon, or formed of SiC from reactions of $SiO_2$ and the hydrocarbon solvent at a high temperature. In embodiments, optionally, the core-shell particles each having a carbonaceous shell layer coated on a nanoparticle can be further processed by calcination. The calcination process can be performed at a temperature ranging from about 600° C. to about 1200° C. or from about 900° C. to about 1100° C. and a pressure ranging from about 2 torr to about 5 atm or from about 4 torr to about 1 atm to devitrify the nanoparticle cores of amorphous silica into single-crystalline α-cristobalite or α-quartz nanospheres, wherein the carbonaceous shell layer can be removed prior to or following the calcination process. The resulting single-crystalline α-cristobalite or α-quartz nanospheres can be non-aggregated, monodisperse nanoparticles. In another example, the calcination process can be performed to the core-shell particles having magnetic metal alloy of FePt nanoparticles, wherein after the further calcination at a temperature ranging from about 500° C. to about 800° C. or from about 600° C. to about 700° C. and a pressure ranging from about 2 torr to about 5 atm or from about 4 torr to about 1 atm, the magnetic metal alloy of FePt can be non-aggregated, monodisperse FePt nanoparticles in super-paramagnetic L10 phase with size uniformity.

In a second exemplary embodiment, core-shell particles can be formed each having a salt shell layer coated on at least one nanoparticle. The nanoparticles can be any suitable nanoparticles as disclosed herein. The salt shell layer can be formed by heating aerosol droplets in the presence of one or more salts at a temperature such that salt vapor can be generated and deposited on the nanoparticles. In one example, the salt can be solid, the heating temperature can be determined lower than the melting point of the salt(s) to generate salt vapor for deposition. In another example, the salt can be molten, the heating temperature can be higher than the melting point of the salt(s) to generate salt vapor for deposition. Sublimation and heterogeneous crystallization of the salt on nanoparticles can form core-shell structures. After heating in the aerosol reactor, the salt shell layer can be a crystal salt and can be removed or washed away after heat treatment. Optionally, a calcination process can be used to further process the nanoparticles of the core-shell particles. In one example, the nanoparticle core of amorphous silica can be devitrified into single-crystalline α-cristobalite nanospheres, which are non-aggregated monodisperse nanoparticles. In another example, magnetic metal alloy of FePt nanoparticle cores can be calcined into super-paramagnetic L10 phase, that are non-aggregated and monodisperse with size uniformity.

In a third exemplary embodiment, the formed monodisperse nanoparticles can include hollow particles. In this case, aerosol droplets formed from the nanoparticle dispersion can be heated in the presence of shell precursors including, for example, hydrocarbon solvents, metal-containing precursors, and combinations thereof, to form core-shell particles. Specifically, the metal-containing precursors can include, for example, metal(s) and/or metal alloy(s) (e.g., placed in the aerosol reactor), metal salt(s) such as carbonyl iron, carbonyl nickel, etc. in a solution or dispersion that are introduced in the aerosol reactor, and/or their combinations. Accordingly, the shell layer can be a carbonaceous shell layer, a metal shell layer, a metal alloy shell layer, or combinations thereof. The nanoparticle core can then be removed from the core-shell particles to form hollow particles that are non-aggregated, monodisperse. In embodiments, the hollow particles can have an average particle size ranging from about 5 nm to about 10 μm or from about 10 nm to about 1 μm. In one example, the nanoparticle core can be formed of a metal oxide such as $SiO_2$, which can be removed using known chemical methods, leaving the hollow particles, for example, having a shell layer of SiC and/or carbon, such as carbon on SiC on $SiO_2$. In another example, while the nanoparticle core is the removable metal oxide such as $SiO_2$, the shell layer for the hollow particles can be a metal shell layer and/or a metal alloy shell layer each including at least one metal selected from the group consisting of Ni, Au, Ag, Pd, Pt, Ga, Zn, Ce, Cr, Ge, Fe, and combinations thereof.

EXAMPLES

Monodisperse single-crystalline α-cristobalite nanospheres were synthesized by hydrocarbon-pyrolysis-induced carbon deposition on amorphous silica aerosol nanoparticles, devitrification of the coated silica at high temperature, and subsequent carbon removal by oxidation such as a low-temperature oxidation or a wet oxidation process. The nanosphere sizes were controlled at least by tuning the size of the colloidal silica precursor in the dispersion.

The formation process utilized monodisperse silica colloids as nanoparticle precursors. The uniform monosized silica colloids, with diameters ranging from about 5 nm to about 2000 nm were synthesized by a modified Stöber method. The colloids were dispersed having a concentration of about 2% to about 4% by weight in ethanol or of about 50/50 (volume/volume) in ethanol-hexane solution. The mixture was sprayed into aerosol droplets using a TSI 9302A atomizer having nitrogen as the carrier gas with a flow rate of about 5 L/min. The aerosol droplets were introduced into a horizontal ceramic tube furnace having a maintained temperature of about 900° C. to about 1100° C. Under this high temperature, vapor pressure resulting from rapid evaporation/boiling of the solvent broke up the aerosol dispersion and dispersed the individual colloidal particles into a well-dispersed silica nanoparticle aerosol suspended in nitrogen along with the solvent vapor. Due to thermal decomposition of solvent molecules under the high temperature, a carbonaceous coating layer deposited, e.g., via accompanying chemical vapor deposition, uniformly on each silica nanosphere to form a core-shell structured nanoparticle. The aerosol particles exiting the aerosol reactor were cooled down by air or water and collected on filter. In some cases, uniformly-sized carbon nanospheres were also generated by self-nucleation of the carbonaceous materials.

For example when aerosol particles were synthesized from colloidal silica particles of about 280 nm, a bimodal particle morphology was observed composed of carbon-coated amorphous silica spheres of about 400 nm in diameter and carbon nanospheres of about 80 nm in diameter. TEM EDS elemental carbon mapping of the edges of the coated silica particles showed a uniform carbonaceous coating having an average thickness of about 60 nm. The smaller carbon nanospheres can be separated from the larger carbon-coated silica particles by centrifugation or gravity precipitation.

The carbon-coated silica particles were further calcined in inert gas at high temperature to devitrify the amorphous silica into crystalline silica. The calcination process was performed in a horizontal alumina tube furnace. The furnace was sealed and heated to a predetermined temperature at a rate of about 5° C./min, and then held for a predetermined time to crystallize the amorphous $SiO_2$—C core-shell nanoparticles. High purity Ar gas (of about 99.99%) was introduced into the tube at a flow rate of about 50 cc/min, while the pressure of the tube was kept at a pressure at about 4 Torr to about 1 atm. The carbon on the particle surface was subsequently removed by wet oxidation via stirring in nitric acid or oxidatively pyrolyzed in air at a temperature of about 300° C. for about 5 hours to about 30 hours depending on carbon layer thickness and calcination conditions.

In one experiment, after calcined at about 1100° C. for about 4 hours followed by carbon removal, silica nanospheres of about 5 nm in diameter was obtained monodisperse and preserved the size of the original colloidal silica precursors. Additionally, silica nanospheres were shown single crystalline, pure phase α-cristobalite. The metastable low-temperature phase was formed by crystallization of β-cristobalite and its subsequent transformation into α-cristobalite upon cooling.

Crystallization of the amorphous $SiO_2$—C core-shell nanoparticles was dependent on the system temperature and pressure, and the size of the amorphous nanoparticles. For all the calcinations performed under atmospheric conditions (at ambient pressure) the calcined silica nanoparticles were still amorphous at temperatures of up to about 1000° C. However, when the calcination was performed under low pressure (e.g., about 4 Torr), the crystallization was observed to occur as low as about 750° C. and well-crystallized cristobalite was formed at about 800° C. Note that low pressures were beneficial to nucleation and coarsening needed to achieve single crystal cristobalite during devitrification. At higher temperatures such as about 1400° C., the carbon shell reacted further with the silica core to form SiC nanospheres or fused silica/SiC/C structures. The final devitrified cristobalite nanoparticles were smaller than the original silica nanoparticles.

In this manner, uniformly sized, single-crystalline, high-purity α-cristobalite nanospheres were formed, which are useful for fillers, catalysts, nanocomposites, advanced polishing, and understanding silica nanotoxicology.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method of forming monodisperse particles comprising:

forming a plurality of aerosol droplets by spraying a dispersion comprising a plurality of nanoparticles disposed in a solvent, the solvent comprising hydrocarbon;

heating the plurality of aerosol droplets at a heating temperature to induce hydrocarbon pyrolysis such that a carbonaceous shell layer is coated on each of the plurality of nanoparticles; and removing the carbonaceous shell layer to form monodisperse nanoparticles.

2. The method of claim 1, wherein the heating temperature is in a range from about 600° C. to about 1600° C. to induce hydrocarbon pyrolysis.

3. The method of claim 1, further comprising controlling a thickness of the carbonaceous shell layer in a range from about 2 nm to about 1000 nm.

4. The method of claim 1, wherein each of the plurality of nanoparticles comprises a material selected from the group consisting of metal, metal oxide, metal nitride, metal alloy, and combinations thereof.

5. The method of claim 1, wherein the plurality of nanoparticles comprise one or more metals selected from the group consisting of Ni, Au, Ag, Pd, Pt, Cu, Li, Ga, Zn, Ce, Cr, Ge, Fe, Co, Ti, Mn, V, Sn, and combinations thereof.

6. The method of claim 1, further comprising calcinating the plurality of nanoparticles prior to removing the carbonaceous shell layer.

7. The method of claim 6, wherein the calcination devitrifies the plurality of nanoparticles comprising amorphous silica into a plurality of single-crystalline α-cristobalite nanospheres to form the monodisperse nanoparticles.

8. The method of claim 6, wherein the plurality of nanoparticles comprise magnetic metal alloy nanoparticles formed of FePt, wherein the magnetic FePt nanoparticles are monodisperse and in super-paramagnetic L10 phase.

9. The method of claim 1, wherein the step of removing the carbonaceous shell layer comprises a low-temperature oxidation or a wet oxidation process.

10. The method of claim 1, wherein the step of spraying a plurality of nanoparticles into a plurality of aerosol droplets comprises using an atomizer.

11. The method of claim 1, wherein the solvent comprises a hydrophilic solvent, a hydrophobic solvent, and combinations thereof.

12. A method of forming monodisperse particles comprising:

forming a plurality of aerosol droplets by spraying a dispersion comprising a plurality of nanoparticles disposed in a solvent;

heating the plurality of aerosol droplets in a presence of one or more salts at a temperature to generate salt vapor, wherein the salt vapor is deposited as a salt shell layer on each nanoparticle of the plurality of nanoparticles; and removing the salt shell layer to form monodisperse nanoparticles.

13. The method of claim 12, wherein the plurality of nanoparticles comprise a material selected from the group consisting of metal, metal oxide, metal nitride, metal alloy, and combinations thereof.

14. The method of claim 12, wherein each of the one or more salts comprises LiCl, NaCl, KCl, LiBr, NaBr, KBr, or combinations thereof.

15. The method of claim 12, wherein the salt shell layer comprises a crystal salt.

16. The method of claim 12, further comprising controlling a thickness of the salt shell layer ranging from about 2 nm to about 1000 nm.

17. The method of claim 12, further comprising calcinating the plurality of nanoparticles prior to removing the salt shell layer.

18. The method of claim 17, wherein the calcination devitrifies the plurality of nanoparticles comprising amorphous silica into a plurality of single-crystalline α-cristobalite nanospheres to form the monodisperse nanoparticles.

19. The method of claim 17, wherein the plurality of nanoparticles comprise magnetic metal alloy nanoparticles formed of FePt, wherein the magnetic FePt nanoparticles are monodisperse and in super-paramagnetic L10 phase.

20. A method of forming monodisperse particles comprising:

forming a plurality of aerosol droplets by spraying a dispersion comprising a plurality of nanoparticles disposed in a solvent;

heating the plurality of aerosol droplets in a presence of one or more of a metal-containing precursor, a hydrocarbon solvent, and combinations thereof at a heating temperature such that a shell layer comprising a metal shell layer, a metal alloy shell layer, a carbonaceous shell layer, or combinations thereof is deposited on each nanoparticle of the plurality of nanoparticles; and removing the each nanoparticle of the plurality of nanoparticles from the shell layer to form a plurality of hollow particles that are monodisperse.

21. The method of claim 20, wherein the plurality of hollow carbon-containing particles have an average particle size ranging from about 5 nm to about 10 μm.

22. The method of claim 20, wherein the plurality of nanoparticles comprise a metal oxide comprising $SiO_2$, while the shell layer of the hollow particles comprises SiC, metal, metal alloy, carbon, or combinations thereof.

* * * * *